April 11, 1967     E. A. MUELLER     3,313,177
FOOT PEDAL

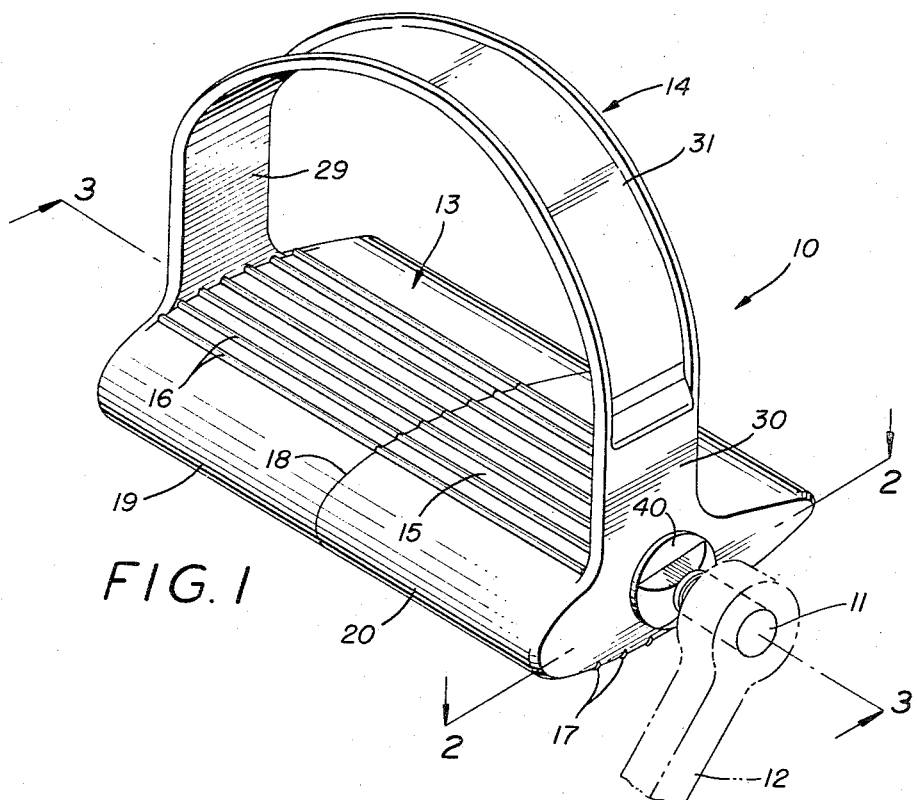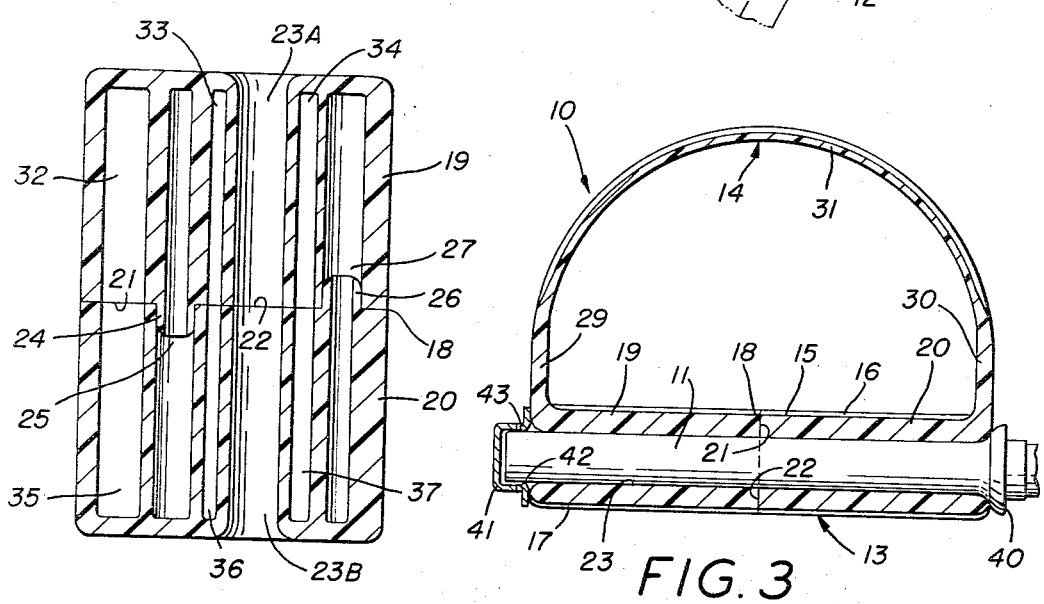

Filed June 16, 1965     2 Sheets-Sheet 2

INVENTOR.
EUGENE A. MUELLER
BY *Hamilton & Cook*
ATTORNEYS

United States Patent Office 3,313,177
Patented Apr. 11, 1967

3,313,177
FOOT PEDAL
Eugene Albert Mueller, Akron, Ohio, assignor to The Hamlin Metal Products Corp., Akron, Ohio, a corporation of Ohio
Filed June 16, 1965, Ser. No. 464,508
5 Claims. (Cl. 74—594.6)

The present invention relates generally to foot-powered vehicles. More particularly, the present invention relates to the foot receiving portion of a foot-powered vehicle. Specifically, the present invention relates to a foot pedal which has a unique construction.

Historically, pedals for foot-powered vehicles, such as tricycles, bicycles and the like, have been complex arrangements having a frame portion journaled onto a stud shaft extending out from the sprocket, or crank arm. Two foot engaging treads were then, in turn, rotatably mounted on the frame portion on opposite sides of the stud shaft. By thus having the frame rotatable with respect to the stud shaft and the treads rotatable with respect to the frame portion, the pedal would readily adapt itself to the foot of the operator, or cyclist, irrespective of the relative radial position of the foot to the stud shaft as it moves through its arc. Moreover, the span of this type pedal, measured across both treads and the journal engaging the stud shaft, was of sufficient dimension and strength to provide a sturdy and comfortable contact area against which the foot of the operator could drive.

The number of components together with the various journal connections required to fabricate such a pedal has, with today's rising cost of labor, virtually precluded the use of such a construction on any but the premium priced foot-powered vehicles.

As an attempted substitute for the above-disclosed time-honored construction, a variety of unimaginative pads molded from plastic or other similar material have been tried, but these have not afforded the desired strength or foot support to be acceptable on any but the most inexpensive applications. Furthermore, in common with their more expensive counterparts, they do not support, or confine, the foot laterally. Many serious accidents can be directly attributed to the slipping of the operator's foot laterally off of the pedal at a crucial moment.

It is therefore an object of the present invention to provide a pedal, for a foot-powered vehicle, having sturdy and comfortable contact area against which the foot of the operator can drive with facility at positions through its arcuate path and yet having no journal parts except its connection to the stud shaft upon which it is mounted.

It is another object of the present invention to provide a foot pedal, as above, which will confine the foot of the operator so that his foot cannot slide laterally off of the pedal.

It is still another object of the present invention to provide a foot pedal, as above, which cooperatively interfits with the stud shaft on which it is carried so as to be rotatable with respect thereto and at the same time laterally secured thereto with, or without, the use of additional fastening means.

These and other objects of the invention, as well as the advantages thereof over existing and prior art forms, will be apparent in view of the following detailed description of the attached drawings and are accomplished by means hereinafter described and claimed.

One preferred embodiment is shown by way of example in the accompanying drawings and hereinafter described in detail without attempting to show all of the various forms and modifications in which the invention might be embodied; the invention being measured by the appended claims and not by the details of the specification.

In the drawings:

FIG. 1 is a perspective view showing a foot pedal embodying the concept of the present invention mounted in operative position on a sprocket crank arm;

FIG. 2 is a cross section taken substantially on line 2—2 of FIG. 1;

FIG. 3 is a cross section taken substantially on line 3—3 of FIG. 1;

Figure 4:
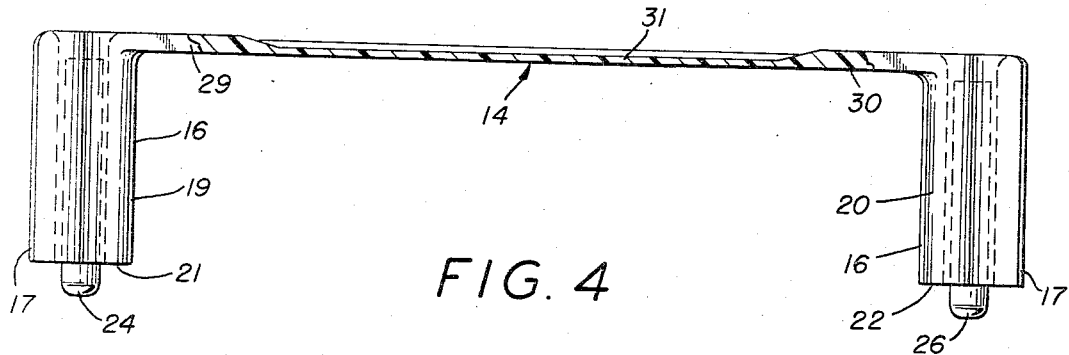
FIG. 4 is a side elevation, partly broken away, of the molded component from which the subject pedal is formed.

In general, a foot pedal according to the present invention has a tread portion and an integral stirrup strap arching laterally upwardly and across the tread portion. A bearing sleeve extends laterally through the tread portion and rotatably receives a mounting stud shaft.

Because the tread portion comprises lateral segments oriented in proper juxtaposition by register means, the tread portion and the integral stirrup strap forming the pedal can be molded as one piece without the necessity for secondary coring. This is done by forming the tread segments in spaced apart cavities joined by a channel which forms the stirrup strap. Upon removal from the mold the stirrup strap is bent to bring the spaced apart tread segments into mating juxtaposition so that they can be secured together on a mounting shaft.

Referring now to the drawings for a more detailed description, the improved foot pedal is designated generally by the numeral 10. The foot pedal 10 is rotatably mounted on a stud shaft 11 extending outwardly of a sprocket crank arm 12. The use of sprocket crank arms, or merely sprocket wheels themselves, to transfer the pumping action of the operator whose foot engages the pedal into motive power are so well known to the cycling art that further environmental description is not deemed necessary.

The pedal 10 is broadly comprised of a tread portion 13 and a flexible stirrup strap 14. The tread portion is of sufficient lateral and longitudinal dimension as to provide a sturdy and comfortable contact area 15 against which the foot of the operator can drive. Additionally, a plurality of nonskid ridges 16 may be applied to the foot contact area 15. In the device shown additional ridges 17 have also been applied to the reverse side of the tread portion 13 for decorative purposes.

The tread portion 13 is divided along a parting line 18 into two tread segments 19 and 20. The abutting parting faces 21 and 22 of the two segments 19 and 20, respectively, are provided with mating register means laterally of the journal sleeve 23 which extends through the tread portion 13. The register means may comprise a stub pin 24 extending outwardly of the parting face 21 which is insertably received in a corresponding recess 25 provided in the opposing face 22, and a similar stub pin 26 extending outwardly with a parting face 22 insertably received in a recess 27 in parting face 21. When these register means 24, 25 and 26, 27 are engaged, the tread segments 19 and 20 present a uniform contact area, and the journal sleeve section 23A in segment 19 is aligned with the journal sleeve section 23B in segment 20. This permits the rotatable receipt of the stud shaft 11 through the journal sleeve sections 23A and 23B.

Oppositely of the parting face 21 one end of the stirrup strap 14 is integrally conjoined to the first tread segment 19, and oppositely of the parting face 22 the other end of the stirrup strap 14 is integrally conjoined to the second tread segment 20. The tread segments 19 and 20 are thus integrally joined through the stirrup strap 14.

It has been found that the plastic material polypropylene provides excellent stability to the tread portion, a wear resistant bearing surface against the metal stud shaft 11 and at the same time is sufficiently flexible to permit natural arching of the stirrup strap 14 upwardly of and across the tread portion 13. However, to assure the desired interference free arching of the stirrup strap 14 the root portions 29 and 30 are of full cross section, and the spanning section 31, extending between the root portions 29 and 30, is of lesser cross sectional area than the root portions, for example channel-shaped, as shown. This not only provides a pleasant appearance, but also permits the root portions 29 and 30 to extend substantially perpendicularly outwardly of the respective tread segments 19 and 20 along the general extent of the root and causes the stirrup strap 14 to arch through the spanning portion 31. With this shape the stirrup strap does not interfere with the ready positioning of the operator's foot on the tread portion 13. This shape also gives the stirrup strap 14 the greatest strength at the root for providing the maximum lateral support to the foot, and at the same time enhances the contact area 15 foot support strength transversely the axis of journal 23.

If one were to mold the pedal directly in the shape shown in FIG. 1, a host of problems would arise with respect to the coring of the bore providing the journal 23 for the stud shaft 11 simultaneously with the opening required between the stirrup strap 14 and the tread portion 13. This problem has been uniquely solved by the division of the tread portion 13 into the two segments 19 and 20. It will be apparent that the location of the parting line 18 with respect to either of the stirrup strap root portions 29 and 30 will be a matter of choice. However, the parting line 18 has been depicted as lying medially of the root portions 29 and 30 inasmuch as this permits the mold in which the pedal is formed to be of minimum thickness.

To make the subject pedal, a pair of spaced apart, parallel cavities are chased in the mold to form the tread segments 19 and 20.

Figure 5:
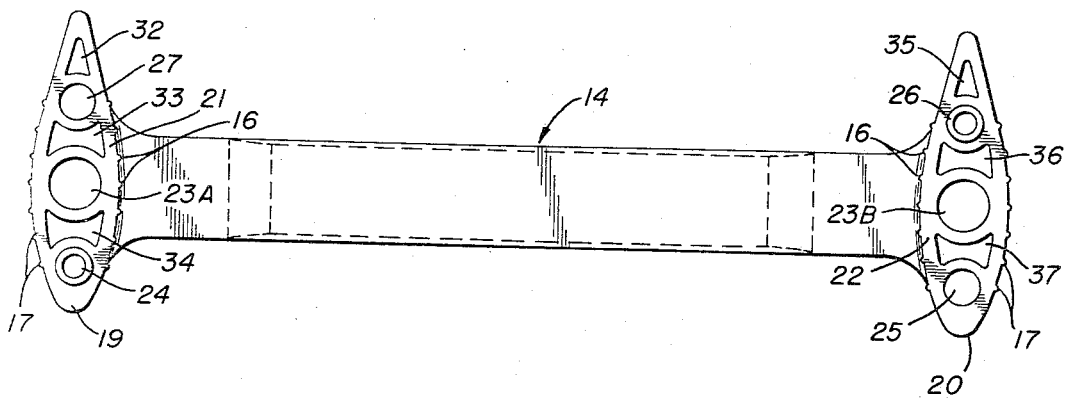
FIG. 5 is a bottom plan taken substantially on line 5—5 of FIG. 4.

A channel is chased between the two cavities to form the stirrup strap 14. As best seen in FIGS. 4 and 5, the register tub pin 24 extending outwardly from the parting face 21 of tread segment 19 can be formed by further chasing the cavity forming the segment 19. The stub pin 26 can be similarly formed in the cavity for tread segment 20.

The recess 27 in the segment 19 adapted to receive stub pin 26 can readily be cored vertically upward from the base of the cavity forming segment 19, and the journal sleeve section 23A can be similarly cored. The recess 25 and the journal sleeve section 23B in tread segment 20 may be identically formed.

In addition to the register recesses 25 and 27 and the journal sleeve 23, it has been found additionally desirable to core the cavities forming the tread segments 29 and 30 so that the wall thickness of the pedal is substantially uniform. This reduces the mass of the molded tread segments and not only represents a reduction in the cost of material but also reduces shrinkage distortion by allowing a uniform cooling of the molded material. As best seen in FIG. 5, these stress relieving cores produce voids 32, 33 and 34 in tread segment 19 and similar voids 35, 36 and 37 in tread segment 20.

The mold cap can be cored to produce the desired cross section in the spanning portion 31 of the stirrup strap 14.

Whether the molding material is introduced into the mold before or after the cap is attached depends primarily upon the particular molding material being used. When using polypropylene it has been found most satisfactory first to cap the mold and then inject the polypropylene.

After the tread segments 19 and 20 and joining stirrup strap 14 are removed from the mold, in the shape depicted in FIGS. 4 and 5, the stirrup strap 14 is bent to juxtaposition the tread segments 19 and 20 with the register means 24, 25 and 26, 27 conjoined. In this position the stud shaft 11 can be inserted through the journal sleeve 23.

A stop flange 40 extending radially of the stud shaft 11 engages the end surface of the tread segment 20 at the axially inner end of the journal sleeve 23. The axially outer end of the stud shaft 11 requires a fastening means to retain the pedal mounted thereon. The preferred form of the invention depicted utilizes a press-nut 41. As shown in FIG. 3, the cap-like nut 41 has inwardly and rearwardly directed spring spurs 42 and 43 which readily flex to permit the nut 41 to slide onto the end of the stud shaft 11 but which oppose removal of the nut by digging into the shaft. This construction works quite well for most any application.

Another form of fastening means which is particularly suitable for children's toys where only a limited laterally directed removal force would be applied to the pedal utilizes a slightly bulbous tip on the outermost end of the shaft 11 which has an outer diameter slightly larger than the inner diameter of the journal sleeve 23.

In any event, it can be readily observed that the above-disclosed method for molding foot pedals produces an inexpensive pedal which has only one journal, which provides adequate contact area for the foot of the operator, affords support to the foot so that it cannot accidentally slide laterally off the pedal and otherwise accomplishes the objects of the invention.

What is claimed is:

1. In combination with a mounting stud, a foot pedal, said foot pedal comprising, first and second tread segments, a continuous stirrup strap arched across said tread segments with its ends joined to the opposite ends of said tread segments, a journal sleeve through said tread segments, said stud shaft rotatably receivable through said journal sleeve, and fastening means to secure said pedal laterally with respect to said stud shaft.

2. In combination with a mounting stud shaft, a foot pedal, said foot pedal comprising, first and second tread segments, a stirrup strap having first and second ends, the first end of said stirrup strap integrally joined to said first tread segment, the second end of said stirrup strap integrally joined to said second tread segment, an integral journal section transversely of each tread segment, register means operative between said first and second tread segments to align the journal sections therethrough, said stud shaft receivable through said journal, and fastening means to secure said pedal laterally with respect to said stud shaft.

3. In combination with a mounting stud shaft, a foot pedal, said foot pedal comprising, first and second lateral tread segments joinable along parting faces, a stirrup strap having first and second ends, the first end of said stirrup strap integrally joined to said first tread segment oppositely of the parting face thereon, the second end of said stirrup strap integrally joined to said second tread segment oppositely of the parting face thereon, an integral journal section transversely of each tread segment, register means on the parting face of said first tread segment cooperatively engaging mating register means on the parting face of said second tread segment to align said first and second tread segments and the journal sections therethrough for receiving said stud shaft, and fastening means to secure said pedal laterally with respect to said stud shaft.

4. In combination with a mounting stud shaft, a plastic foot pedal, said foot pedal comprising, first and second substantially hollow lateral tread segments joinable along parting faces, a flexible stirrup strap having first and second ends, the first end of said stirrup strap integrally joined to said first tread segment oppositely of the parting face thereon, the second end of said stirrup strap integrally joined to said second tread segment oppositely of the parting face thereon, an integral journal section transversely and interiorly of each tread segment, register means secured in said first tread segment at the parting face thereof engaging mating register means secured in said second tread segment at the parting face thereof to align said first and second tread segments and the journal sections therethrough for receiving said stud shaft, and fastening means to secure said pedal laterally with respect to said stud shaft.

5. In combination, as set forth in claim 4, in which the stirrup strap has root portions extending generally perpendicularly outwardly of the tread segments and a spanning portion extending between the root portions, said spanning portion having a lesser cross sectional area than said root portions.

References Cited by the Examiner

UNITED STATES PATENTS

| | | | |
|---|---|---|---|
| 597,830 | 1/1898 | Herrick | 74—594.6 |
| 638,649 | 12/1899 | Sieverkropp | 74—594.6 |

FOREIGN PATENTS 14,936  10/1888  Great Britain.

FRED C. MATTERN, JR., *Primary Examiner.*

W. S. RATLIFF, *Assistant Examiner.*